B. Holly,
Water Supply Regulator.
No. 4,087. Reissued Aug 2. 1870.
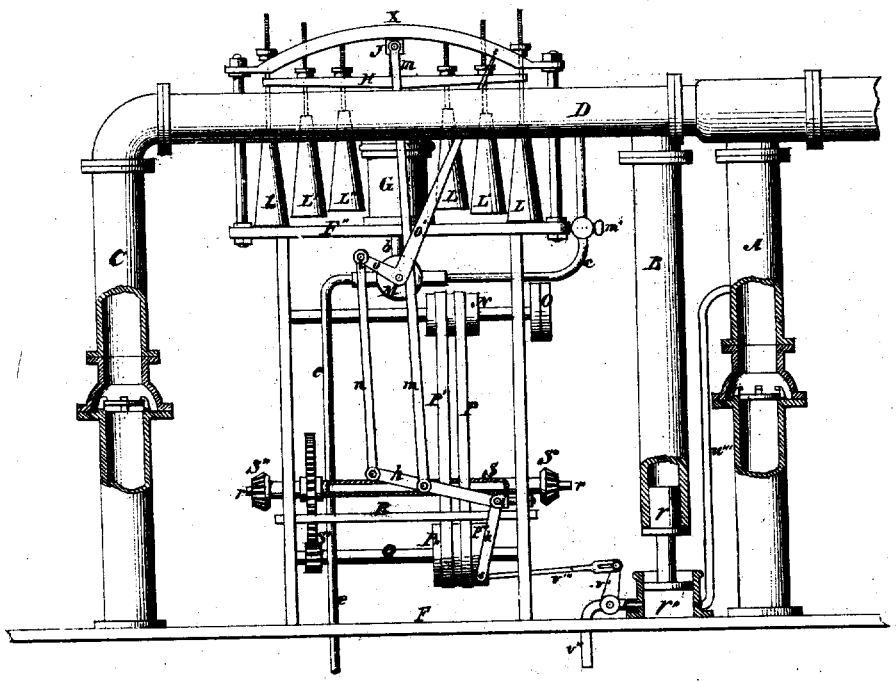
Witnesses.
R. T. Campbell,
L. H. Campbell
Inventor
Birdsill Holly
by
Munn, Fleming & Lannen
N. PETERS, PHOTO-LITHOGRAPHER, WASHINGTON, D. C.

UNITED STATES PATENT OFFICE.

BIRDSILL HOLLY, OF LOCKPORT, NEW YORK.

IMPROVEMENT IN WATER-SUPPLY REGULATORS FOR WATER-WORKS.

Specification forming part of Letters Patent No. 87,413, dated March 2, 1869; reissue No. 4,087, dated August 2, 1870; application filed June 27, 1870.

DIVISION C.

*To all whom it may concern:*

Be it known that I, BIRDSILL HOLLY, of Lockport, in the county of Niagara and State of New York, have invented a new and Improved Water-Supply Regulator for Water-Works; and I do hereby declare that the following is a full, clear, and exact description thereof, reference being had to the accompanying drawing forming part of this specification.

The object of this invention, so far as is claimed in the present subdivision, is to prevent the bursting of the water-pipes by the great pressure to which they are sometimes subjected. For this purpose I provide a relief-valve, which is so contrived as to allow of the escape of water sufficient to afford the requisite relief before the pressure has reached a degree that is productive of danger.

The drawing shows the entire apparatus of my water-supply regulator; but as this has mostly been particularly described in the subdivision A and B of this reissue, I shall give no description of the same now any further than may be necessary for my present purpose.

G is a cylinder containing a piston and connected from below with the water-gage M, which water-gage connects with one of the main pipes D by the pipe *c*. A piston-rod extends from the cylinder upward to the cross-head J, to one end of which cross-head is attached the rod *m*, with a corresponding rod at the other end of this cross-head. But these rods connect with the arm *h*. When the pressure in the pipe is increased it raises the piston, which carries up the cross-head *J*, and with it the rod *m*, and causes the arm *h* to turn in a greater or less degree around the pivot *i*. When this movement is sufficient it opens the cock *v'*, and allows of the escape of water from the water-chamber V'', which water-chamber is connected with one of the main pipes B by the pipe *u*. V' is a piston, which fits in the water-chamber V'', and is connected by its stem with the valve V in the lower end of the pipe B. The valve V has an annular shoulder, closely fitting upon the end of the pipe B, and which effectually closes the outlet from that pipe. The other portion of that valve, which enters into the pipe B, is so constructed as to permit the water to pass freely out of that pipe without withdrawing the stem of the valve therefrom whenever the annular shoulder of the valve is depressed from its seat. Now, although the degree of pressure in the water-chamber V'' is the same when the cock *v'* is closed as that within the pipe B, yet, inasmuch as the surface of the piston *v* is greater than the interior opening of the pipe B, the upward pressure in the aggregate will be greater than the downward, and the valve V will be held firmly in its seat, and the lower end of the pipe B will be effectually closed by it; but when the cock *v'* is opened, so that the water in the chamber V'' is permitted to discharge through the pipe *v''*, the pressure in the water-chamber will be less than that in the pipe B, and when this difference is sufficient the valve V will open, and thus relieve the pressure in the pipe B, as well as in all the others with which it is connected. Now, suppose an extraordinary pressure to be brought upon the water in the pipe B, sufficient, if unrelieved, to produce a dangerous strain upon the apparatus. The piston in the cylinder G will be driven very considerably upward. Through the rod *m*, the arms *h k*, and the arm *v'''*, this motion will be communicated to the cock *v'*, which will be opened, and the pressure in the pipe B, which, if allowed to go on increasing, might prove dangerous, will be at once relieved in the manner above shown. The piston in the cylinder G will fall accordingly, and the corresponding movement of the arm *v'''* will close the cock *v'*, and everything will soon resume its normal condition.

It will be observed that the arm *v'''* is slotted where it takes hold of the wrist of the cock *v'*. The purpose and effect of this are to prevent the cock from moving with every slight motion of the piston in the cylinder G, and will only be opened or closed when some considerable motion up or down is given to the piston in the cylinder G. It will be also seen that the pipes C and A are partially cut away to exhibit check-valves to prevent the pressure from reacting against the pumps.

Having thus explained my invention, what I claim as new, and desire to secure by Letters Patent in this subdivision of my reissue patent, is—

1. The water-chamber V″, with its inlet-pipe $u'''$, its outlet-pipe $v''$, and cock $v'$, the whole constructed as and for the purpose described.

2. In combination with the water-chamber V″, and with its piston $v$, the relief-valve V, the whole constructed as and for the purpose described.

3. The cylinder G, with its piston, in combination with the cock $v'$ and intermediate machinery, by which the cock may be opened automatically when the pressure of water in the pipe A is very considerably increased, and closed in like manner when that pressure is relieved.

4. In combination with the above-recited machinery for operating the relief-valve V, the slot in the arm $v'''$, so constructed, adjusted, and arranged that the cock which opens the outlet-pipe $v''$ will not commence to turn in either direction for any slight increase or diminution of the pressure in the pipe A, substantially as shown.

BIRDSILL HOLLY.

Witnesses:
C. G. HILDRETH,
F. T. SCOVELL.